United States Patent
Bella et al.

(10) Patent No.: US 6,212,258 B1
(45) Date of Patent: Apr. 3, 2001

(54) DEVICE FOR REMOTELY TESTING A TWISTED PAIR TRANSMISSION LINE

(75) Inventors: Gregory L. Bella, Naperville, IL (US); Michael Clegg, Little Abington (GB)

(73) Assignee: Westell Technologies, Inc., Aurora, IL (US)

( * ) Notice: Subject to any disclaimer, the term of this patent is extended or adjusted under 35 U.S.C. 154(b) by 0 days.

(21) Appl. No.: 09/199,562

(22) Filed: Nov. 25, 1998

(51) Int. Cl.[7] .............. H04M 1/24; H04M 3/08; H04M 3/22

(52) U.S. Cl. ................. 379/29; 379/1; 379/27; 379/29

(58) Field of Search .................. 397/27, 29, 1, 397/17, 26

(56) References Cited

U.S. PATENT DOCUMENTS

| | | | |
|---|---|---|---|
| 4,197,435 | * 4/1980 | Jackson et al. | 179/175.3 R |
| 4,626,632 | * 12/1986 | Mazz | 379/29 |
| 4,641,299 | 2/1987 | Kemper et al. | 370/15 |
| 4,653,084 | 3/1987 | Ahuja . | |
| 4,682,347 | 7/1987 | Lynch . | |
| 4,707,851 | 11/1987 | Horton et al. . | |
| 4,754,472 | 6/1988 | Hing . | |
| 4,788,710 | 11/1988 | Lynch . | |
| 4,791,659 | 12/1988 | Ross | 379/22 |
| 4,852,145 | 7/1989 | Bevers et al. . | |
| 4,862,491 | * 8/1989 | La Salle et al. | 379/6 |
| 5,060,226 | 10/1991 | Gewin et al. . | |
| 5,073,919 | 12/1991 | Hagensick . | |
| 5,166,925 | 11/1992 | Ward | 370/55 |
| 5,195,124 | 3/1993 | Ishioka . | |
| 5,224,149 | 6/1993 | Garcia . | |
| 5,345,496 | 9/1994 | Galpin | 379/29 |
| 5,357,556 | * 10/1994 | Dresser | 379/27 |
| 5,402,073 | 3/1995 | Ross . | |
| 5,471,517 | 11/1995 | Nakagawa | 379/29 |
| 5,553,059 | * 9/1996 | Emerson et al. | 379/29 |
| 5,604,785 | * 2/1997 | Pryor et al. | 379/2 |
| 5,659,570 | 8/1997 | Cotreau et al. . | |
| 5,956,386 | * 9/1999 | Miller | 379/27 |
| 5,982,852 | * 11/1999 | Schwartz | 379/29 |
| 6,002,671 | * 12/1999 | Kahkoska et al. | 370/248 |
| 6,058,161 | * 5/2000 | Anderson et al. | 379/27 |
| 6,061,427 | * 5/2000 | Ryoo | 379/1 |

\* cited by examiner

*Primary Examiner*—Curtis A. Kuntz
*Assistant Examiner*—Quoc D. Tran
(74) *Attorney, Agent, or Firm*—Pennie & Edmonds LLP

(57) ABSTRACT

A network interface device intended to be placed approximate to the customers equipment and remote from a central office of a telephone company ("TELCO"). The purpose of the network interface device is to allow the twisted pair transmission line between the central office and the customer's port to be selectively switched from a normal monitoring mode into a test mode. In the test mode, the NIU transmits a signal back to the central office so that the central office is able to determine whether there are any problems with the transmission line, the potential bandwidth for the transmission line and related parameters concerning the efficacy and suitability of the transmission line for a variety of communication services. A network interface device in accordance with the present invention has a monitor circuit which looks for a request signal from the central office. Upon receipt of the request signal, the detector circuit activates a relay to disconnect the customer equipment from remainder of the system and establishes a connection to a test signal generator and other components of the NIU. A test signal generator outputs onto the transmission line a predetermined signal for analysis. The duration of this signal is controlled by a reset control circuit which toggles the relay to break off connection to the remaining components of the NIU and re-establish the connection between the customer port and the network port for further ADSL communications.

28 Claims, 3 Drawing Sheets

DEVICE FOR REMOTELY TESTING A TWISTED PAIR TRANSMISSION LINE

TECHNICAL FIELD

The present invention is directed to remotely monitoring and evaluating a twisted pair transmission line, such as that used in telephone line communication. It is especially directed to communication systems, such as an asynchronous digital subscriber line ("ADSL") which use a telephone line for communication between a customer and a central office.

RELATED APPLICATIONS

NONE

BACKGROUND OF THE INVENTION

Asymmetric Digital Subscriber Line (ADSL) is a technology which allows for simultaneous voice and data traffic to coexist over a communication channel comprising a standard telephone transmission line. Typically, the standard telephone transmission lines comprise an unshielded twisted pair of copper wire having a gauge of 22–26AWG. Twisted pairs, which can be used to connect a central telephone system (a 'central' unit) to a subscriber's telephone (a 'remote' unit) can support bandwidths of up to 2 MHz through the use of digital signal processing (DSP) technology. Thus, they can be used for bandwidth-intensive applications, such as internet access and video-on demand, as well as for carrying voice traffic. Frequency division multiplexing is used so that a plurality of signals, each occupying a different frequency band, can be simultaneously sent over the same transmission line.

The voice traffic band comprises a number of frequency sub-bands, or channels, ranging from DC to 20 KHz. The analog voiceband frequency is typically specified as 200–4000 Hz. Customer specified additions may include phone operation up to 8 KHz and 12–16 KHz billing tones. In addition, DC to 30 Hz frequencies are typically assigned for auxiliary analog signaling purposes, such as ringing the telephone, dial pulsing and on/off hook signaling.

ADSL data traffic bandwidth for CAP (carrierless amplitude and phase) modulation is typically from 35 KHz–1.5 MHZ. Of this, upstream data traffic (i.e., remote unit to central unit) uses the 35 KHz–191 KHz band, while the downstream traffic (i.e., central unit to remote unit) uses the 240 KHz–1.5 MHZ band.

Before providing the customer with ADSL service, the telephone company ("TELCO") must determine whether the line is suitable for ADSL communication. This is typically done by testing the lines between the TELCO's central office or substation, and the customer's site. In cases where the ADSL service is provided to the customer's residence, this often means testing the line at the point of entry to the building in which the customer's dwelling is located. After initiation of ADSL service, there are occasions in which the customer experiences problems in ADSL communication. In those instances, then TELCO must determine whether the trouble lies with the TELCO's equipment or with the customer's equipment. To make this determination, a TELCO representative may visit the customer's site to test whether the twisted pair line from the customer's site to the TELCO central office or substation is working properly. This requires considerable expense due to the time taken by the repairman. What is desirable is an apparatus and method for remotely testing the TELCO's ADSL equipment, without having to travel to the customer's site.

SUMMARY OF THE INVENTION

The present invention is directed to an interface unit which is installed proximate to the customer's equipment, in which can be selectively operated from a remote location to test the TELCO's ADSL equipment. A device in accordance with the present invention is installed between the customer's port and the TELCO's port at the point where the line enters the customer's site.

A device in accordance with the present invention operates in one of two modes: a monitor mode and a test mode. In the monitor mode a subcircuit of the device looks for a request signal asking the device to switch from the monitor mode to the test mode. When a valid request signal is received from the central office on the twisted pair, the device is switched into the test mode. In the test mode, a signal generator of the device transmits a test signal from the unit to the central station on the twisted pair. A timer circuit associated with the device returns the unit to the monitor mode from the test mode after a predetermined period of time. The device also includes a voltage regulator which provides an operating voltage for the remaining components and subcircuits of the device.

BRIEF DESCRIPTION OF THE DRAWINGS

The present invention can better be understood through the attached figures in which.

DETAILED DESCRIPTION OF THE PREFERRED EMBODIMENT

Figure 1:
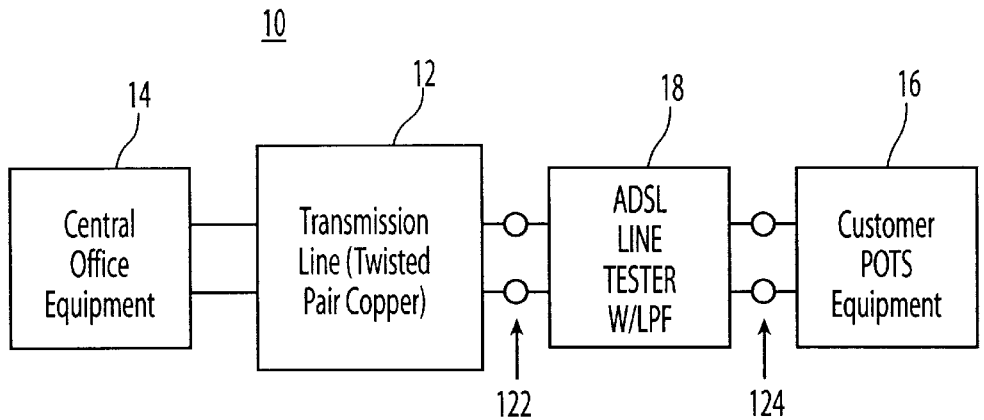
FIG. 1 presents a block diagram of ADSL system which incorporates a network interface unit in accordance with the present invention.
Figure 3:
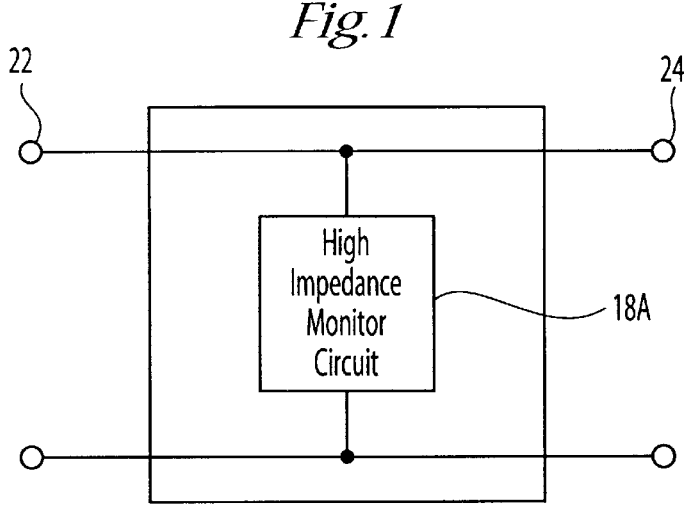
FIGS. 3 and 4 present block diagrams of the functional modes in which the network interface unit operates.
Figure 4:
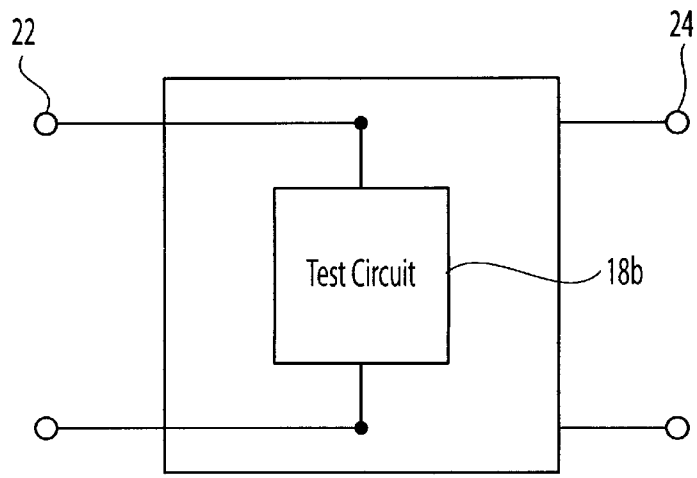

FIG. 1 shows an ADSL system 10 which incorporates a device in accordance with the present invention. The ADSL system 10 comprises a transmission line 12 which extends between a central office 14 and a customer's site 16. In addition, in accordance with the present invention, the ADSL system 10 includes a network interface unit 18 (NIU) which is physically located near the customer's equipment 16 and interfaces the customer equipment to the transmission line 12.

As shown in the figures, the network interface unit 18 is dual ported with one side connected to a network interface port 22 and the other side connected to the customer port 24. The purpose of locating a network interface unit close to the customer's site is to allow the central office 14 to test whether its transmission equipment and the transmission line 12 are functioning properly without having to visit the customer's site. This testing is made possible by the design and function of the Network Interface Unit.

Figure 2:
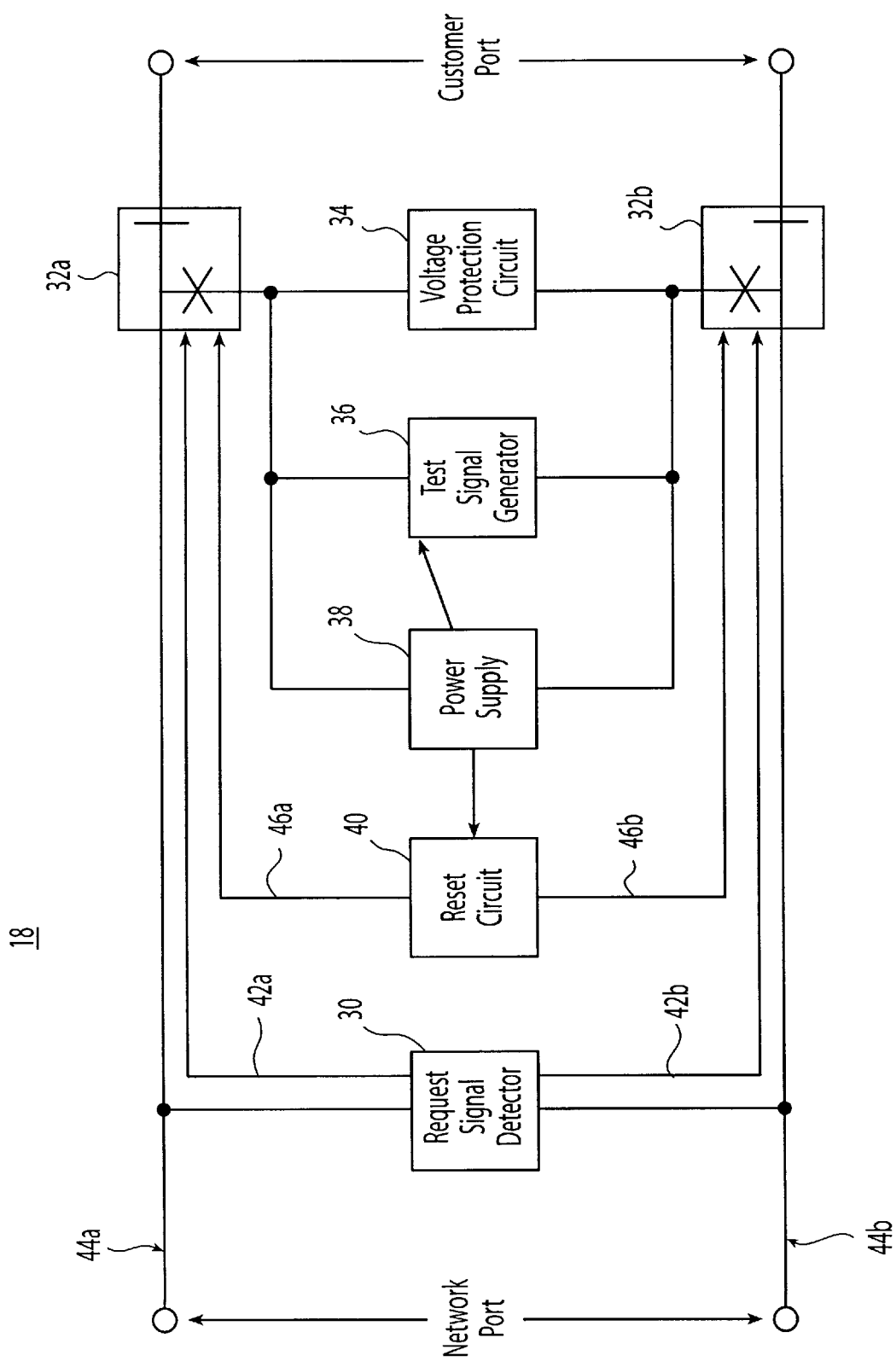
FIG. 2 presents a block diagram of the network interface unit of the present invention.
Figure 5:
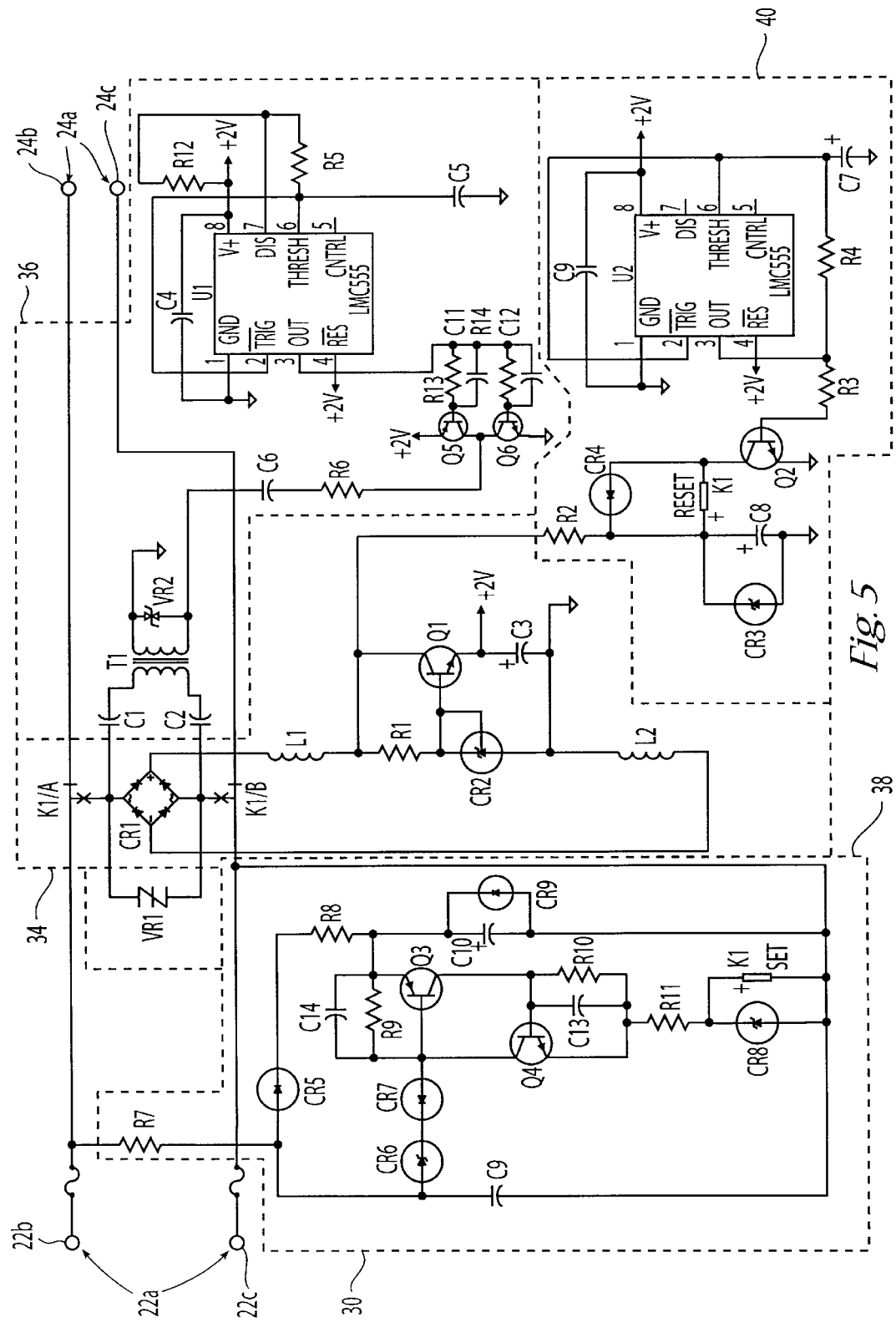
FIG. 5 presents a detailed diagram of the network interface unit of FIG. 2.

FIG. 2 shows a functional block diagram of the NIU. As seen in FIG. 2, the NIU comprises a request signal detector 30, a pair of line-control switches 32a, 32b, a voltage protection circuit 34, a test signal generator 36, a power supply 38, and a reset control circuit 40. As seen in FIG. 5, the NIU has a first port 22a comprising terminals 22b, 22c on the network side and a second port 24a comprising corresponding terminals 24b, 24c on the customer side.

The request signal detector 30 is a high impedance circuit connected across the network port which is configured to detect a valid request signal sent by the central office. The request signal may take any number of forms. For instance, it could be a coded sequence of pulses sent from the central office. Alternatively, it may be a signal having predetermined spectral and amplitude characteristics. In the preferred embodiment, however, the request signal is a battery reversal condition having a predetermined duration. Once the detector 30 recognizes that a valid request signal has been received, it outputs a first control signal on lines 42a, 42b, in order to switch the NIU from the monitor mode to the test mode.

Switches 32a and 32b connect the voltage nodes 44a, 44b at the network side port 22a to the customer side port 24a, when the NIU is in the monitor mode. Thus, in the monitor mode the presence of the NIU is transparent to the customer equipment and the central office only sees a high impedance monitor circuit 18a shunted across the transmission lines 12. Upon receiving the first control signal on lines 42a, 42b from the request signal detector 30, the switches 32a, 32b break the connection between the network port to the customer port, and instead establish a connection to the circuitry of the NIU to form a test circuit 18b. Because switches 32a, 32b are activated at the same time in response to receipt of a valid request signal, the switches 32a, 32b may be implemented as a single double-pole double-throw electronic switch which selectively connects a pair of input lines to either of two pairs of output lines. Whether in the monitor mode or in the test mode, the terminals 22b, 22c of the network side port 22a serve as first and second voltage nodes having an input voltage therebetween.

When switches 32a, 32b are toggled into the test mode, other components of the NIU are activated. First, the voltage protection circuit 34 is activated and serves to prevent an over voltage condition across the transmission line which might otherwise destroy the NIU. In addition, the power supply 38 is activated and outputs a DC operating voltage $V_s$ which is used to drive the test signal generator 36 and the reset control circuit 40. The NIU's power supply 38 draws its power from the office battery voltage. Therefore, the power supply 38 does not need to be provided with a local battery or other power source.

The test signal generator 36 outputs a signal and this signal is sent down the transmission line 12 back to the central office. The test signal maybe a narrow band tone, a broad band sweep or may take on any of an infinite number of spectral characteristics. The test signal's waveform may be sinusoidal, triangular, a square wave, or take on one of any number of different shapes. In the preferred embodiment, however, a 300 KHz square wave is generated by the test signal generator 36 and is received at the central office or other facility for analysis with known equipment such as spectrum analyzers and computers using established analytical techniques. This allows the central office to determine a number of parameters including 300 KHz insertion loss, harmonic insertion loss, return loss, phase distortion and predicted ADSL line data rate.

The reset control circuit 40 serves to return the switches 32a, 32b back to the monitor mode from the test mode after a predetermine lapse of time. Thus, the reset control circuit 40 limits the duration that the test signal is sent to the central office. This duration must be of sufficient length to allow the central office to assess the performance of the ADSL system between the central office to the customer's port. In the preferred embodiment, the reset control circuit allows the test signal generator to send a signal for the predetermined period of time of 30 seconds. At the end of this period, the reset control circuit 40 sends a reset control signal on lines 46a, 46b to switches 32a, 32b respectively. In response to the reset control signal, the switches 32a, 32b reconnect the network port to the customer port, and disable the test signal generator and other components of the NIU.

FIG. 5 shows the preferred embodiment of the NIU in accordance with the present invention. It is first noted in FIG. 5 that the switches of FIG. 2 are implemented by means of dual pole double throw latching relay whose contacts are designated K1/A and K1/B, both contacts being simultaneously activated in response to a signal received at one of two coils associated with the relay—a "set" coil and a "reset" coil. Each contact of the relay K1 selectively connects one member of the twisted pair to a corresponding element. In the monitor mode, the relay connects the network side port 22a with the customer side port 24a. Under these conditions the voltage protection circuit 34, the test signal generator 36, the power supply 38, and the reset control circuit 40 are all disabled. However the request signal detector 30 is always enabled and monitors the signal coming on the transmission line.

As seen in FIG. 5, the request signal detector 30 provides an input impedance of R7 plus the collective impedance of the remainder of a circuit comprising the detector 30. As shown in Table 1, R7 is preferably 2 MHz and so in the monitor mode, the input impedance of the NIU is at least 2 MΩ. Such an impedance level meets the requirements of some telephone companies, although a lower impedance level of, say, 500 KΩ meets the requirements of other telephone companies. Regardless of the input impedance due to R7, the time constants formed by R7, C9 and RB, C10 are selected to filter out a 20 Hz ringing signal so that the request signal detector does not false trigger due to the voltage reversal associated with a ringing signal.

As is known to those skilled in the art, the central office outputs a quiescent transmission line battery voltage of a predetermined polarity across the twisted pair 12. The magnitude of the voltage is nominally 48 volts, although it may vary from between 42–65 volts. The transmission line battery voltage is used by the NIU both to trigger the request signal detector as well as power the remaining circuitry of the NIU. In the preferred embodiment, the request signal detector triggers on a reverse voltage condition, e.g., −48 volts, on the twisted pair for a predetermined period of time. The circuit of FIG. 5 requires a reverse voltage condition of at least 1.5 seconds, although the circuit can easily be configured to respond to some other minimum duration. Thus, to switch from the monitor mode to the test mode, the central office outputs a request signal comprising a reverse voltage of this duration on the twisted pair 12.

When in the monitor mode, capacitors C9 and C10 charge up to the quiescent transmission line DC voltage (typically a 48 volt feed from the central office). Therefore, the voltage at PNP transistor Q3's emitter and base are also at the quiescent transmission line DC voltage and so Q3 initially does not conduct. When a reverse battery condition occurs, C10 cannot discharge due to diode CR5. However, under the reverse voltage condition, capacitor C9 first discharges through R7 and, due to the reverse voltage, then begins to charge with a polarity opposite to that of C10. C10, however, does not discharge under the reverse voltage condition because of bypass diode CR9. When the voltage difference between C10 (which remains at about 48 volts during the reverse voltage condition) and C9 exceeds the Zener voltage of CR6 (51 volts in the preferred embodiment), Q3 begins to go into the active region. Since Q3's collector is connected to Q4's base, Q4 also becomes active. When transistor Q4 turns on, its collector current causes Q3 to turn on even harder, sending both transistors into saturation. This results in C10 discharging through resistor R11 and the SET coil of the relay K1. After approximately 2 ms, the relay K1 sets, thereby disconnecting the customer from the transmission line 12 and engaging the test circuit.

Once relay K1 has been set by detector 30, the remainder of the NIU is activated. The voltage protection circuit 34 comprises clamping circuit VR1 which acts as an open circuit at voltages below ±100 volts. When the voltage between the twisted pair 12 exceeds ±100 volts, clamping circuit acts as a short circuit between relay contacts K1/A and K1/B. When the current through the relay drops below the holding current, the clamping circuit once more becomes an open circuit.

The power supply 38 includes a bridge circuit CR1 arranged in electrical parallel with the voltage protection circuit 34. When the relay K1 is set, bridge circuit CR1 begins to conduct and provides a current through inductor L1. The current then flows through resistor R1 and into base lead of NPN transistor Q1. Because the base-collector voltage is reversed biased, transistor Q1 begins to conduct with a current flowing through capacitor C3 and inductor L2 back to the bridge circuit CR1. In the course of charging up C3, the positive node of C3 connected to the emitter of Q1 reaches a level of +2 volts. This level of +2 volts is maintained so long as the relay K1 is set and some voltage of either polarity is provided at the first port. Thus, the emitter voltage of Q1, where it connects to capacitor C3, is kept steady at +2 volts, and this voltage is tapped to provide the input voltage to drive the remainder of the NIU circuit. CR2 is preferably implemented as a TL431 and serves to ensure that the base-emitter voltage of Q1 never exceeds a predetermined value, thereby regulating the voltage and Q1's emitter. Inductors L1 and L2 isolate the remainder of the power supply 38 from the signal generator 36 by effectively blocking AC signals. Thus, in the present invention, the power supply is run off of the line voltage of the twisted pair, onto which a signal from the test signal generator is placed.

The test signal generator in the preferred embodiment is implemented by means of a LMC555 timer U1. This timer is configured to output a square wave having a frequency of 300 KHz. The frequency output by the timer is determined selected by the specific values of R12, R5 and C5. In the preferred embodiment, the 300 KHz frequency is used because it is a standard frequency used to benchmark ADSL system performance. However, if desired, other frequencies above 35 KHz can also be used as the test signal.

The output of the LMC555 timer U1 is sent to an output driver formed by transistors Q5, Q6, current limiting base resistors R13, R14 and speed-up capacitors C11 and C12 which preserve charge to quickly turn on/turn off Q5 and Q6. The output driver is used to insulate the output pin of the 555 timer from the impedance load of transistor T1.

The output driver acts as a trigger which outputs a signal acceptable for transmission back to the central office. In this instance, the test signal generated by the output driver passes through R6 and C6 before it is applied to transformer T1 prior to transmission. The test signal then passes through AC coupling capacitors C1, C2 which block DC, before the test signal is applied to the transmission line via relay contacts of relay K1. Voltage protection element VR2 ensures that the signal applied to coil T1 stays below a predetermined value, in this case 5 volts.

The reset control circuit 40 is implemented using a second LMC555 timer U2, and so the reset control circuit and the reset control circuit can be formed from a single 556 dual-timer. In the preferred embodiment of FIG. 5, the LMC555 timer U2 triggers the RESET coil of the relay K1 after 30 seconds. It should be noted, however, that the 30 second value is determined by the specific values used for R4 and C7. After 30 seconds the OUT pin on the 555 timer U2 outputs a signal which passes through base resistor R3 and into the base lead of transistor Q2. This turns on transistor Q2, thereby resetting relay K1. Once relay K1 has been reset, the effect of the signal generator 36 no longer impacts the signal on the transmission line and the transmission line itself returns to the monitor mode in which the request signal detector 30 further awaits a valid request signal.

Table 1 lists the component values of the inductors, resistors and capacitors in the circuit of FIG. 5, while Table 2 provides information about the remaining components.

TABLE 1

Component Values for Inductors, Resistors & Capacitors in Filter Circuit of FIG. 5

| COMPONENT | VALUE |
|---|---|
| L1, L2 | 470 µH |
| R1 | 20 KΩ |
| R2 | 50 KΩ |
| R3 | 1200 Ω |
| R4 | 1 MΩ |
| R5 | 18 KΩ |
| R6 | 100 Ω |
| R7 | 2 MΩ |
| R8 | 100 KΩ |
| R9 | 249 KΩ |
| R10 | 249 KΩ |
| R11 | 100Ω, ½W |
| R12 | 1 KΩ |
| R13, R14 | 5 KΩ |
| C1, C2 | 0.068 µF |
| C3 | 100 µF |
| C4 | 0.1 µF |
| C5 | 100 pF |
| C6 | 0.1 µF |
| C7 | 20 µF |
| C8 | 100 µF |
| C9 | 1 µF |
| C10 | 47 µF |
| C11 | 200 pF |
| C12 | 200 pF |
| C13, C14 | 0.1 µF |

TABLE 2

Components in Circuit of FIG. 5

| COMPONENT | DESCRIPTION |
|---|---|
| CR1 | KBP204G from Diodes, Inc. |
| CR2 | TL431 |
| CR3, CR8 | 1N5229B, 4.3 V Zener |
| CR4, CR5, CR7, CR9 | 1N4454 |
| CR6 | 1N4757A 51 V Zener |
| VR1 | Part no. P0800EC from Teccor |
| VR2 | 1.5KE10C from Motorola |
| T1 | 651-K427 from Midcom |
| K1 (dual relay) | TQ2E-L2-3 V from Aromat |
| Q1, Q2, Q4, Q6 | MPS8099 from Motorola |
| Q3, Q5 | MPS8599 from Motorola |
| U1, U2 | 555 CMOS timers |

A device in accordance with the present invention can be used whenever it is desirable to temporarily isolate equipment connected to a twisted pair transmission line for testing purposes. Thus, instead of only being useful for ADSL services, the present device can be used in conjunction with a variety of narrowband and broadband communication systems which use a twisted pair. In such case, changing the signal generator to output different test signals may allow ones to test the suitability of the twisted pair for a wide variety of communication services.

A device in accordance with the present invention may be implemented on a printed circuit board using discrete components and portions may even be implemented as an application-specific integrated circuit (ASIC). In addition, as is known to those skilled in the art, portions of the signal generator circuit and reset control circuit, among other components of the device, can be replaced by a microprocessor or other programmable unit, albeit at greater expense using current technology.

Therefore, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A two-wire POTS/xDSL network interface device operable in one of a normal monitor mode and a test mode and configured to interface a twisted pair transmission line to customer equipment in a communication system, said network interface device comprising:
   a bidirectional first port comprising first and second terminals establishing respective first and second voltage nodes;
   first and second switches electrically connected to said first and second terminals, respectively;
   a bidirectional second port comprising third and fourth terminals selectively connected to respective first and second terminals via respective first and second switches, said second port being connected to the first port when the device is in the monitor mode, and being disconnected from the first port when the device is in the test mode;
   a detector circuit connected in electrical parallel across said first and second voltage nodes and configured to detect a request signal, said detector circuit being further configured to output a first control signal to said first and second switches upon detection of said request signal, to thereby place the device in the test mode;
   a power supply circuit connected to said first port via said first and second switches, and arranged to output a DC supply voltage when the device is in the test mode, said power supply circuit being powered by a voltage applied across the first and second voltage nodes; and
   a signal generator circuit coupled to said first port via said first and second switches, and configured to output a predetermined test signal to said first port, when the device is in the test mode, said signal generator being powered by said DC supply voltage from said power supply circuit; and
   a control circuit configured to output a second control signal to said first and second switches to return the device to the monitor mode from the test mode.

2. The device of claim 1, wherein the detector circuit is configured to detect a request signal comprising a predetermined DC voltage of a predetermined polarity applied across said first and second voltage nodes, for a predetermined period of time.

3. The device of claim 1, wherein the detector circuit provides an input impedance of at least 500 KΩ.

4. The device of claim 1, wherein the detector circuit provides an input impedance of at least 2 MΩ.

5. The device of claim 1, wherein said control circuit comprises:
   a first timer circuit configured to output said second control signal a predetermined period of time after said signal generator circuit has begun to output said predetermined test signal to said first port.

6. The device of claim 5, wherein said signal generator circuit comprises:
   a second timer circuit configured to output a square wave having a predetermined frequency to the first port, when the device is in the test mode.

7. The device of claim 1, wherein said signal generator circuit comprises:
   a timer circuit configured to output a square wave having a predetermined frequency to the first port, when the device is in the test mode.

8. The device of claim 1, further comprising:
   a voltage protection circuit connected in electrical parallel with said power supply circuit.

9. The device of claim 1, wherein said first and second switches comprise a latching relay having a pair of dual contacts, said relay comprising:
   a first coil coupled to said detector circuit, said first coil being responsive to said first control signal to connect said first port to said signal generator circuit and disconnect said first port from said second port, and
   a second coil coupled to said control circuit, said second coil being responsive to said second control signal to connect said first port to said second port and disconnect said second port from said signal generator circuit.

10. A communication system configured to selectively operate in a monitor mode and in a test mode, said communication system comprising:
    a twisted pair transmission line connected at a first end to a central office, said central office providing a first office battery voltage of a first polarity across said pair; and
    a two-wire POTS/xDSL network interface device connected to a second end of the twisted pair transmission line, said network interface device comprising:
       a bidirectional first port comprising first and second terminals establishing respective first and second voltage nodes;
       first and second switches electrically connected to said first and second terminals, respectively;
       a bidirectional second port comprising third and fourth terminals selectively connected to respective first and second terminals via respective first and second switches, said second port being connected to the first port when the device is in the monitor mode, and being disconnected from the first port when the device is in the test mode;
       a detector circuit connected in electrical parallel across said first and second voltage nodes and configured to detect a request signal, said detector circuit being further configured to output a first control signal to said first and second switches upon detection of said request signal, to thereby place the device in the test mode;
       a power supply circuit connected to said first port via said first and second switches, and arranged to output a DC supply voltage when the device is in the test mode, said power supply circuit being powered by a voltage applied across the first and second voltage nodes; and a signal generator circuit coupled to said first port via said first and second switches, and configured to output a predetermined test signal to said first port, when the device is in the test mode, said signal generator being powered by said DC supply voltage from said power supply circuit; and a control circuit configured to output a second control signal to said first and second switches to return the device to the monitor mode from the test mode.

11. The system of claim 10, wherein the detector circuit is configured to detect a request signal comprising a second battery voltage having a polarity opposite said first battery voltage applied across said pair, for a predetermined period of time.

12. A method of remotely testing a two-wire POTS/xDSL communication system which includes a twisted pair transmission line across which a first office battery voltage having a first polarity is normally applied, said method comprising the steps of:

sending, from a first location remote from a customer's site, a request signal comprising a second battery voltage comprising a reversal in polarity of said first office battery voltage for at least a predetermined period of time, along the twisted pair transmission line and through a bidirectional first port at the customer's site;

electrically isolating a customer's equipment from said twisted pair transmission line, in response to said request signal;

receiving, at said first location, a test signal sent through said bidirectional first port and along the twisted pair transmission line from a point physically proximate to said customer's equipment, the test signal being sent automatically in response to said request signal; and analyzing said received test signal to assess the performance of the communication system.

13. The method of claim 12, wherein said test signal comprises a square wave having a frequency between 35 KHz and 1.5 MHz.

14. The method of claim 12, wherein said test signal comprises a square wave having a frequency of 300 KHz.

15. The method of claim 12, wherein said first battery voltage is between 42 to 65 volts and said second battery voltage is between −42 to −65 volts.

16. The method of claim 12, comprising the additional step of generating a supply voltage from one of said first and second battery voltages to power transmission of said test signal, after the step of electrically isolating the customer's equipment.

17. A two-wire POTS/xDSL network interface device operable in one of a normal monitor mode and a test mode and configured to interface a twisted pair transmission line to customer equipment in a communication system, said network interface device comprising:

a bidirectional first port comprising first and second terminals establishing respective first and second voltage nodes;

first and second switches electrically connected to said first and second terminals, respectively;

a bidirectional second port comprising third and fourth terminals selectively connected to respective first and second terminals via respective first and second switches, said second port being connected to the first port when the device is in the monitor mode, and being disconnected from the first port when the device is in the test mode;

a detector circuit connected in electrical parallel across said first and second voltage nodes and configured to detect a request signal, said detector circuit being further configured to output a first control signal to said first and second switches upon detection of said request signal, to thereby place the device in the test mode; and a signal generator circuit coupled to said first port via said first and second switches, and configured to output a predetermined test signal to said first port, when the device is in the test mode; wherein the detector circuit is configured to detect a request signal which comprises a reversal in polarity of an office battery voltage applied across said first and second voltage nodes for a predetermined period of time.

18. The device of claim 17, wherein said request signal has a voltage between −42 to −65 volts.

19. The device of claim 17, wherein the detector circuit provides an input impedance of at least 500 K$\Omega$.

20. The device of claim 17, wherein the detector circuit provides an input impedance of at least 2 M$\Omega$.

21. A communication system configured to selectively operate in a monitor mode and in a test mode, said communication system comprising:

a twisted pair transmission line connected at a first end to a central office, said central office providing a first office battery voltage of a first polarity across said pair; and a two-wire POTS/xDSL network interface device connected to a second end of the twisted pair transmission line, said network interface device comprising:

a bidirectional first port comprising first and second terminals establishing respective first and second voltage nodes;

first and second switches electrically connected to said first and second terminals, respectively;

a bidirectional second port comprising third and fourth terminals selectively connected to respective first and second terminals via respective first and second switches, said second port being connected to the first port when the device is in the monitor mode, and being disconnected from the first port when the device is in the test mode;

a detector circuit connected in electrical parallel across said first and second voltage nodes and configured to detect a request signal, said detector circuit being further configured to output a first control signal to said first and second switches upon detection of said request signal, to thereby place the device in the test mode; and a signal generator circuit coupled to said first port via said first and second switches, and configured to output a predetermined test signal to said first port, when the device is in the test mode; wherein said detector circuit is configured to detect a request signal comprising a second battery voltage comprising a reversal in polarity of said first office battery voltage applied across said pair, for a predetermined period of time.

22. The communication system of claim 21, wherein said first office battery voltage is between 42 to 65 volts and said second battery voltage is between −42 and −65 volts.

23. The communication system of claim 21, wherein the detector circuit provides an input impedance of at least 500 K$\Omega$.

24. The communication system of claim 21, wherein the detector circuit provides an input impedance of at least 2 MΩ.

25. The network interface device according to claim 5, wherein the first timer circuit comprises a 555 timer.

26. The network interface device according to claim 5, wherein the first and second timer circuits comprise first and second 555 timers, respectively.

27. The network interface device according to claim 26, wherein the first and second 555 timers belong to a common 556-type dual timer.

28. The network interface device according to claim 6, wherein the second timer circuit comprises a 555 timer.

* * * * *